(12) United States Patent
Toennessen

(10) Patent No.: US 8,792,298 B2
(45) Date of Patent: Jul. 29, 2014

(54) INTERCONNECTING TOW MEMBERS OF A MARINE SEISMIC SYSTEM

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 779 days.

(21) Appl. No.: 12/501,589

(22) Filed: Jul. 13, 2009

(65) Prior Publication Data

US 2010/0170428 A1    Jul. 8, 2010

Related U.S. Application Data

(60) Provisional application No. 61/081,978, filed on Jul. 18, 2008.

(51) Int. Cl.
*G01V 1/38* (2006.01)
*G01V 1/20* (2006.01)

(52) U.S. Cl.
CPC .............. *G01V 1/201* (2013.01); *G01V 1/3843* (2013.01)
USPC .................... 367/20; 367/14; 367/15; 367/16; 114/252; 114/249

(58) Field of Classification Search
CPC ........ B63B 21/66; B63B 21/663; G01V 1/38; G01V 1/3826; G01V 1/3843; G01V 1/201
USPC ........ 24/114.5, 611; 52/632, 112–121, 122.1, 52/124.2, 125.2, 125.6; 212/267, 292, 212/296; 285/87, 312, 901, 924; 367/18, 367/16, 20, 153, 191; 403/322, 325, 330; 14/22, 23; 114/89, 90, 95, 102.18, 114/102.19, 111, 112, 377, 378, 310, 210, 114/230.2, 5, 230.26, 230.29, 249, 252, 114/245, 253; 182/186.8; 248/610, 612, 248/616, 62, 63, 64; 254/408, 409, 410, 254/411, 413, 401, 402; 166/343; 174/101.5; 181/111; 439/323, 347, 923
See application file for complete search history.

(56) References Cited

U.S. PATENT DOCUMENTS 4,644,617 A * 2/1987 Tupper et al. ................... 24/611
4,663,900 A * 5/1987 Rehm et al. ..................... 52/115

(Continued)

FOREIGN PATENT DOCUMENTS

JP        02-129584 A    5/1990
WO       0101169 A1    1/2001

OTHER PUBLICATIONS

PCT Search Report, dated Feb. 2, 2010, Application No. PCT/US2009/050721.

*Primary Examiner* — Isam Alsomiri
*Assistant Examiner* — Daniel L Murphy

(57) ABSTRACT

A marine seismic system having a tow vessel; a first tow member connected to the tow vessel; a second tow member connected to the tow vessel; a first distance member having a first end connected to the first tow member and a second end connected to the second tow member; and a first attachment device connecting the first end to the first tow member, the first attachment member operational between an engaged position securing the first end of the distance member in a fixed position relative to the first tow member and a disengaged position permitting the first attachment device to move along a portion of the first tow member.

19 Claims, 5 Drawing Sheets

(56) References Cited

U.S. PATENT DOCUMENTS

| | | | |
|---|---|---|---|
| 4,721,180 A * | 1/1988 | Haughland et al. | 181/111 |
| 4,802,694 A * | 2/1989 | Vargo | 285/87 |
| 5,056,954 A * | 10/1991 | Flux et al. | 403/330 |
| 5,357,892 A | 10/1994 | Vatne et al. | |
| 5,692,918 A * | 12/1997 | Hill | 439/323 |
| 5,980,148 A | 11/1999 | Pascouet | |
| 6,224,113 B1 * | 5/2001 | Chien | 285/85 |
| 6,758,157 B2 | 7/2004 | Grieger et al. | |
| 7,415,936 B2 | 8/2008 | Storteig et al. | |
| 2002/0064088 A1 * | 5/2002 | Barker | 367/20 |
| 2006/0227657 A1 | 10/2006 | Tveide et al. | |
| 2006/0227658 A1 * | 10/2006 | Toennessen et al. | 367/18 |
| 2007/0019504 A1 | 1/2007 | Howlid et al. | |
| 2008/0087435 A1 * | 4/2008 | Reddy | 166/343 |

* cited by examiner

INTERCONNECTING TOW MEMBERS OF A MARINE SEISMIC SYSTEM

RELATED APPLICATIONS

This application claims the benefit of U.S. Provisional Patent Application No. 61/081,978 filed Jul. 18, 2008.

BACKGROUND

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid provide more information regarding the subsurface formations than two-dimensional seismic surveys. 3-D surveys may be conducted with up to twelve or more streamers that form an array covering a large area behind the vessel. The streamers typically vary in length between three and twelve kilometers. Tail buoys attached at the streamer distal ends may carry radar reflectors, navigation equipment, and acoustic transponders. Hydrophones are positioned along each streamer. The hydrophones may or may not be wired together in receiver groups spaced along each streamer. The in-line interval between hydrophones or groups of hydrophones ranges between about 3 and 25 meters, with 12.5 meters comprising typical interval spacing.

Since the grid is often much wider than the array, the tow vessel must turn around and tow the array in laps across the grid, being careful not to overlap or leave large gaps between the laps across the grid. A multiple streamer array utilizes diverters near the vessel to pull the streamers outwardly from the direct path behind the seismic tow vessel and to maintain the transverse or cross-line spacing between individual streamers. Diverters rely on hydrodynamic lift created by forward motion through the water to pull the streamers outwardly and to maintain the transverse position relative to the vessel path. If forward motion changes due to ocean currents and other environmental factors, the diverters may not maintain the desired streamer position.

In 4-D geophysical imaging, a 3-D seismic survey is repeated over a grid that has been previously surveyed. This series of surveys taken at different times may show changes to the geophysical image over time caused, for example, by extraction of oil and gas from a deposit.

It is important that the sources being used to generate the acoustical pulses be located as closely as possible to the same location as in previous surveys over the same grid. This, of course, has been difficult to accomplish in a marine survey because the acoustical source arrays are typically towed behind the tow vessel and are subject to wave and current movement.

In addition to the deployment and operation difficulties associated with towing multiple streamers, conventional techniques limit the ability to position source equipment and receivers in different relative positions and orientations. Because the sources and receivers are towed behind the same seismic vessel, array design is limited by the tow configuration and vessel layout. Each towed array is also subject to crosscurrents, wind, waves, shallow water, navigation obstacles, and steering limitations that limit the coverage provided by the survey system.

SUMMARY

One embodiment of a marine seismic system includes a tow vessel; a first tow member connected to the tow vessel; a second tow member connected to the tow vessel; a first distance member having a first end connected to the first tow member and a second end connected to the second tow member; and a first attachment device connecting the first end to the first tow member, the first attachment member operational between an engaged position securing the first end of the distance member in a fixed position relative to the first tow member and a disengaged position permitting the first attachment device to move along a portion of the first tow member.

An embodiment of a device for connecting a distance member to a tow member of a marine seismic survey system includes a housing having an internal bore for disposing the tow member; and a locking mechanism operational from an engaged position securing the housing to a fixed position along the tow member and a disengaged position permitting the housing to slide along the tow member.

An embodiment of a method of operating a seismic survey system includes the steps of towing a first tow member and a second tow member from a tow vessel; connecting a first distance member between the first and the second tow member, the first end of the first distance member connected to the first tow member by a first attachment device; actuating the first attachment device to an engaged position securing the first end of the first distance member to the first tow member; and actuating the first attachment device from the engaged position to a disengaged position permitting the first end of the distance member to move along a length of the first tow member.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The present disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
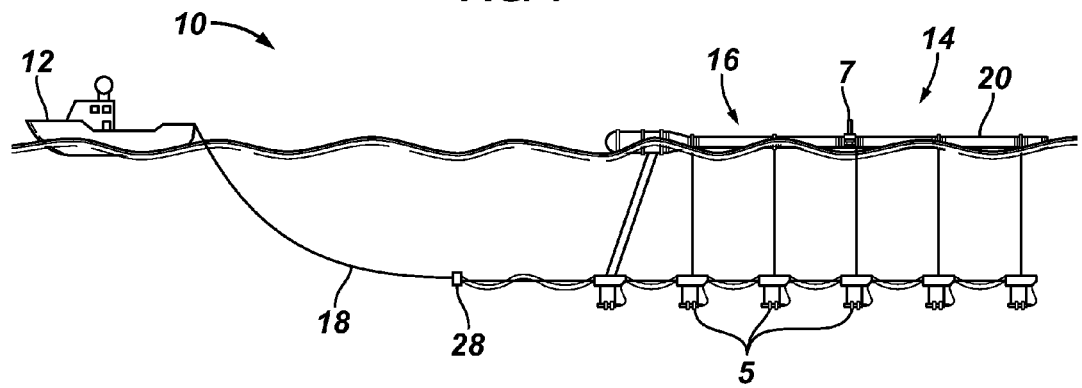
FIG. 1 is an elevation view of a marine seismic system in accordance with an exemplary embodiment of the invention.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Embodiments of marine seismic survey systems include a source array, sometimes referred to in the art as a gun-array or a sub-array. The source array may include one or more source members, sometimes referred to herein as air-guns. The source array may be connected to an independently steerable deflecting member, or winch, that may be utilized to steer and control the cross-line position of its respective source array. As used herein the term "source array" is meant to include acoustic sources or source members. The term "source" or "source member" is meant to include all acoustic sources, including, but not limited to, air-guns, oscillating members, vibration members, explosive charges, percussion devices, and the like. The terms source-array, gun-array and sub-array are often used interchangeably in the art to call out an assembly including an array of acoustic sources, floats, chains, hang plates, everything required to position the source-array and for it to operate. Finally, the terms "source," "seismic source," and "marine seismic source" and other similar terms may be used interchangeably herein, to include some or all source members. For example, a source may include multiple source arrays, more typically one to four source arrays.

A "separation" or "distance" member may be a cable or strength-taking umbilical inter-connecting two or more tow members. Separation member and distance member may be utilized from time to time herein to describe a similar member. However, in some embodiments "source separation member" may be utilized to designate a member that connects a source tow member to a streamer tow member, while a "streamer separation member" may be used to designate a member that connects two or more streamer tow members to one another; and a distance member may be utilized to interconnect source tow members. As will be noted in various embodiments, collars may be connected to the end of one or more separation and distance members to connect the respective member to a source tow member, streamer tow member, and/or deflector tow member. Separation and distance members are known to be connected to a respective tow member by fixed type connectors or connecting means. For example, some distance type members are fixedly connected, i.e. connected in a fixed position, by tying the distance member, for example a rope, to the tow member or by use of a shackle. Some of the known connection devices are non-locking, or non-engaging devices, such as sliding collars. These connection devices are free to move along the tow member.

FIG. 1 is an elevation view of a marine seismic survey system, generally denoted by the numeral 10, according to an embodiment of the invention. A tow vessel 12 is towing a seismic source 14 that includes one or more source arrays 16 by a source tow member (e.g., cable) 18. In the embodiment of FIG. 1, source array 16 includes a plurality of acoustic source members 5 suspended from a source array float 20. Source members 5 are illustrated as air-guns in this embodiment, which may be fired to generate acoustical waves that are reflected from the subsurface geological features back to receivers (not shown) during a seismic exploration. Source members 5 may be other acoustical-wave generation devices, such as explosives, percussion devices, and the like. A global positioning system (GPS) unit 7 may be connected, for example to float 20. GPS 7 may be utilized to notify the system's navigation system of the exact location of source array 16.

FIG. 1 also illustrates an attachment device, generally denoted by the numeral 28, connected at a distal or terminal end of source tow member 18 proximate to source array 16 in accordance with an exemplary embodiment of the invention. Attachment device 28 provides a selectively releasable connection of an end of a distance member 30 (FIGS. 2-4 and 6) to source tow member 18. Attachment device 28 is referred to as a locking collar, or locking gun collar. Attachment device 28 is depicted in FIG. 1 connected at the terminal end of source tow member 18 (e.g., cable, string, etc.) where it connects to source array 16. Various exemplary embodiments of the attachment device 28 will be described further with reference to the various Figures.

Figure 2:
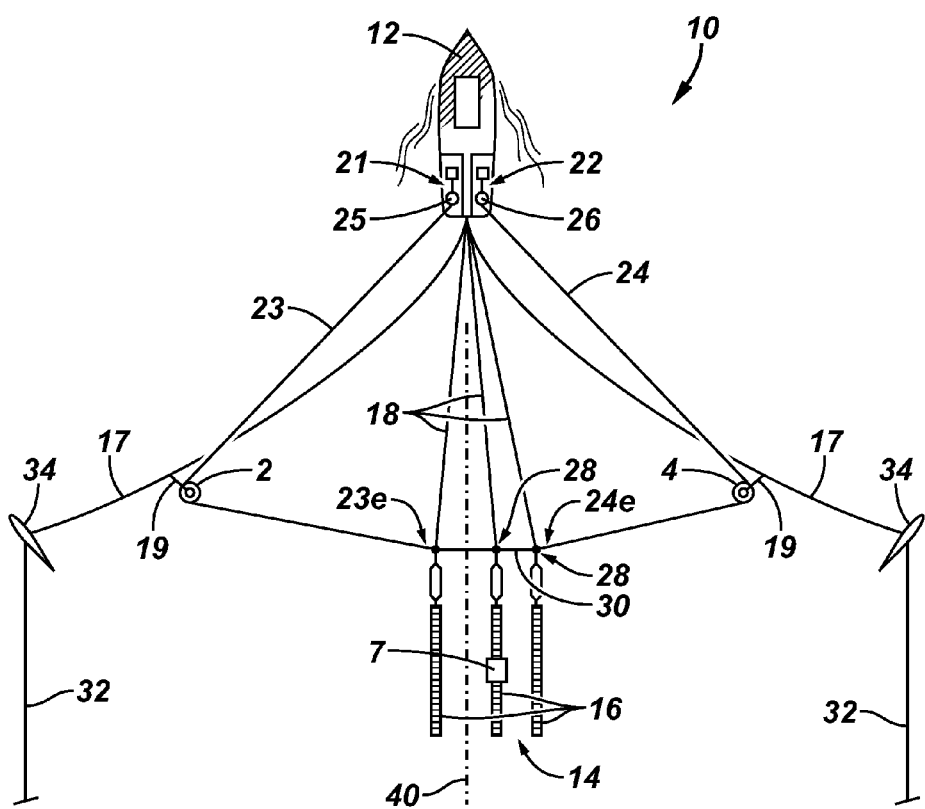
FIG. 2 is an aerial view of a winch steerable marine seismic system in accordance with an exemplary embodiment of the invention.

FIG. 2 is an aerial view of a marine seismic survey system 10 having a deck mounted winch for guiding the source array 16. Embodiments of winch steerable marine systems 10 are disclosed in U.S. Pat. No. 7,415,936, the teachings of which are incorporated herein. Tow vessel 12 tows source 14 by source tow members 18 attached to source 14. Source 14 includes a plurality of source arrays 16 that are tied together with distance members 30. Tow vessel 12 may also tow deflectors 34 by the deflected lead-ins 17. Deflectors 34 pull the seismic streamer cables 32 off the centerline 40 of tow vessel 12 so that seismic streamer cables 32 do not simply follow the centerline of tow vessel 12 as they are towed through the water, thereby promoting a desired spread and separation of the streamer cables. A description of a deflector 34 that may be utilized is described in U.S. Pat. No. 5,357,892, which is hereby fully incorporated herein by reference.

Two winches 21, 22 are mounted on tow vessel 12 in the depicted embodiment. Alternatively, one winch having double reels (not shown) may be mounted on the tow vessel. Winch cables 23, 24 are wrapped onto each of the reels 25, 26 and the ends 23e, 24e of each of the cables 23, 24 are attached to respective opposite sides of source 14. Each winch cable 23, 24 is threaded through a pulley 2, 4 attached to the deflected lead-ins 17 by a cable 19. While steering the source array 16, the reels 25, 26 both rotate at the same time but in opposite directions so that as one winch cable 23 is pulled in or shortened, the other winch cable 24 is let out or lengthened. As the first reel 25 rotates to pull in the winch cable 23, the lateral forces generated by the deflectors 34 are exerted on the source array 16 by the winch cable 23 and the pulley 2 through which the winch cable 23 passes.

Distance member 30 (e.g., cable, rope, etc.) is connected between adjacent source tow cables 18 to couple adjacent tow members 18 together in a manner to maintain a set distance between the adjacent source tow members 18. In the depicted systems, each distance member 30 is connected to one or both of the adjacent source tow members 18 by attachment device 28. As will be disclosed further below, one or both of the ends of distance member 30 may be connected by an attachment device 28. In some embodiments, at least one end of the distance member 30 is connected to its respective tow member by a connection other than attachment device 28. Other attachments include means and devices, such as knots and shackles, for fixedly connecting distance member 30 to tow member 18 and non-fixed connections such as sliding, non-locking collars.

Figure 3:
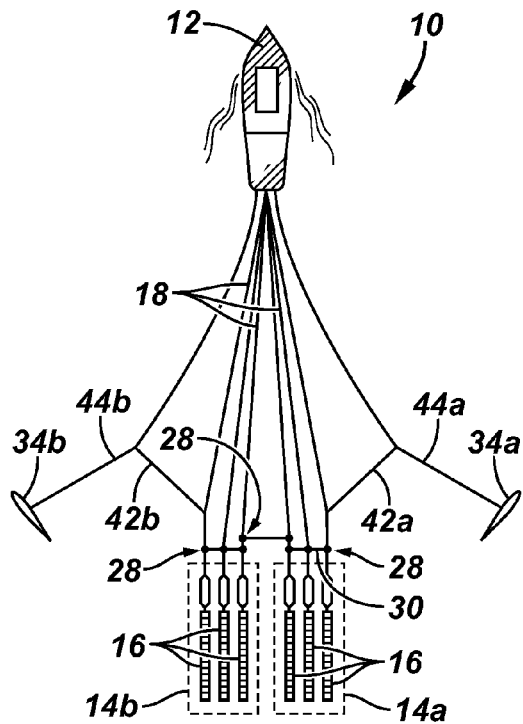
FIG. 3 is an aerial view of a marine seismic system in accordance with another exemplary embodiment of the invention.

FIG. 3 is an aerial view of marine seismic survey system 10, according to another exemplary embodiment is illustrated. The depicted system includes a pure source vessel 12 that is not towing any seismic streamers. Pure source tow vessel 12 is towing dual sources 14a, 14b. Each source 14a, 14b includes more than one source array 16. Each source array 16 is towed by an independent source tow member 18 in this embodiment. A pure source vessel 12 may be utilized in combination with towed streamers and/or ocean bottom cable systems.

Distance members 30 are illustrated attached between adjacent tow members 18. As will be further understood from the description below, each distance member 30 may be connected to one or the other, or both adjacent tow cables 18 by an attachment device 28. In other words, a first end of distance member 30 may be connected to a first source tow member 18 by attachment device 28 and the other end of distance member 30 may be connected to adjacent tow member by a different type of attachment such as a knot, shackle, or sliding collar.

In this embodiment, deflectors 34a and 34b are respectively connected to tow vessel 12 by separate deflector tow members 44a and 44b. In accordance with some embodiments, a separation member 42a connects a starboard-most source tow member 18 with deflector tow member 44a, and a separation member 42b connects a port-most source tow member 18 with deflector tow member 44b.

Figure 4:
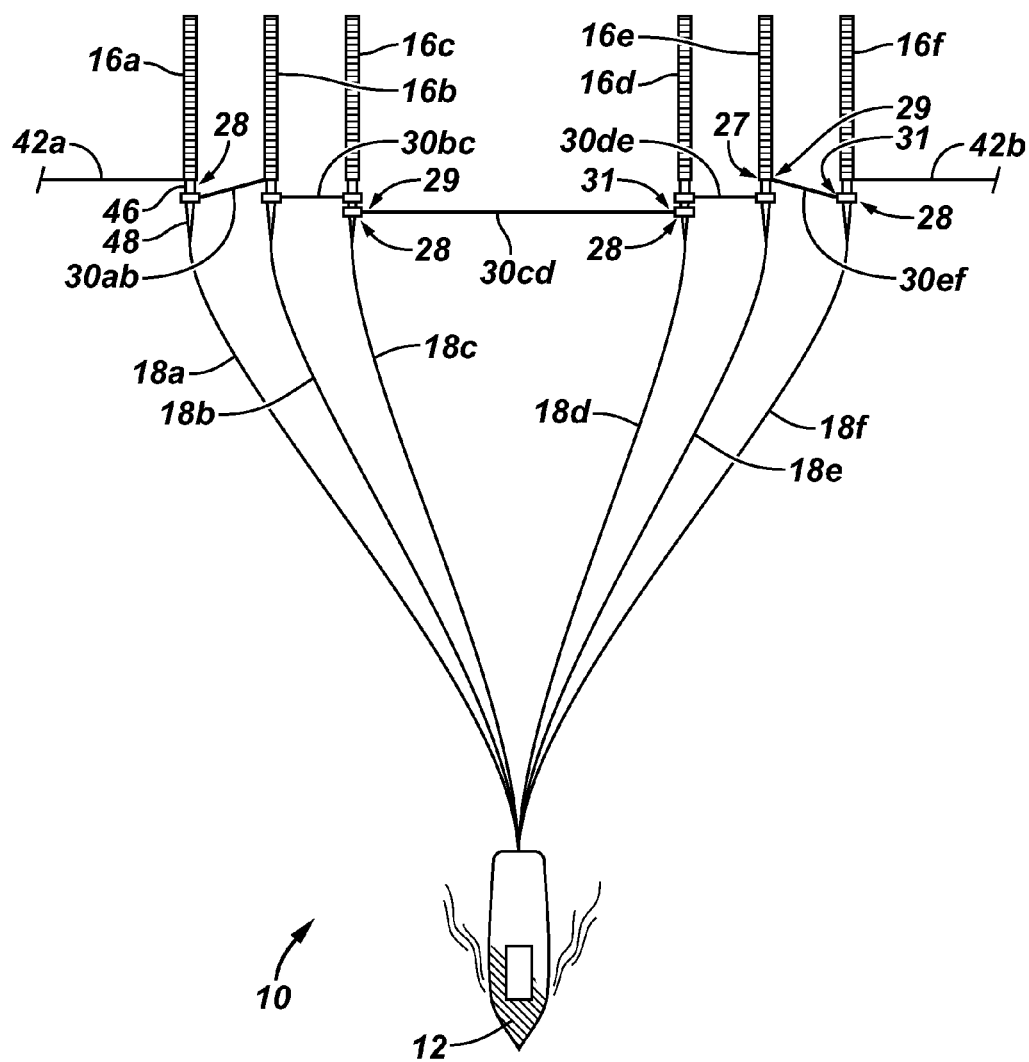
FIG. 4 is an aerial view of a marine seismic system illustrating the interconnection of adjacent source array strings via distance members in accordance to an exemplary embodiment of the invention.

Refer now to FIG. 4 wherein source cross-tagging is illustrated. FIG. 4 illustrates a plurality of source arrays identified as 16a, 16b, 16c, 16d, 16e, and 16f for purposes of description. Each source array is towed from vessel 12 by a tow member 18 identified by a subscript corresponding to the towed source array. In the illustrated embodiment, each source array 16 is connected to an adjacent source array 16 by a distance member 30. For purposes of description, a source tow member 18 and its connected source array 16 are referred to collectively as a source array string which is denoted by the same numeral as the included source array. For example, source array string 16a includes source tow member 18a and towed source array 16a.

Each distance member 30 includes a first end 29 connected to one source array string and a second end 31 connected to a second source array string. For example, distance member 30cd includes a first end 29 connected to tow member 18c of source array string 16c and a second end 31 connected to tow member 18d of source array string 16d. Each end may be connected to its respective source array string in various manners, including being fixedly connected (e.g., tying, knot, shackle), connected by a free-sliding connector (e.g., collar); or by attachment device 28. For example, end 29 of distance member 30cd is connected to source array string 16c by an attachment device 28 and end 31 is also connected by an attachment device 28 to source array string 16d. Similarly, distance members 30bc and distance member 30de are attached to their respective adjacent source array strings by attachment devices 28.

Distance members 30ab and 30ef illustrate distance members that have only one end connected to a respective source array string via an attachment device 28. For example, first end 29 of distance member 30ef is illustrated as connected to source array string 16e by an attachment 27, for example a shackle. Shackles are commonly used to fixedly connect a distance member. Attachment 27 may also be a non-engaging, or non-locking, type connection. Non-engaging, or non-locking is utilized herein to describe a connection such as a sliding collar that does not have an engaged position in which the device is fixedly secured to the tow member or the like. Second end 31 of distance member 30ef is shown connected to source array string 16f by an attachment device 28. With reference to source array string 16a, attachment device 28 is shown disposed proximate to terminal end 46 and bend restrictor 48 of source tow member 18a.

Figure 5:
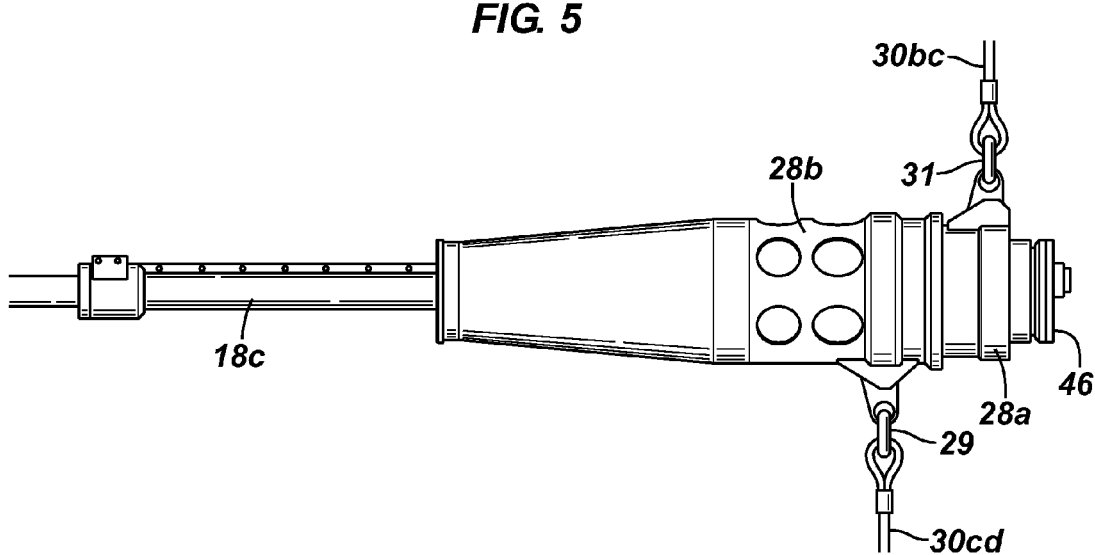
FIG. 5 is an elevation view of dual distance member attachment devices connected to a sea end of a source tow member according to an exemplary embodiment of the invention.
Figure 5A:
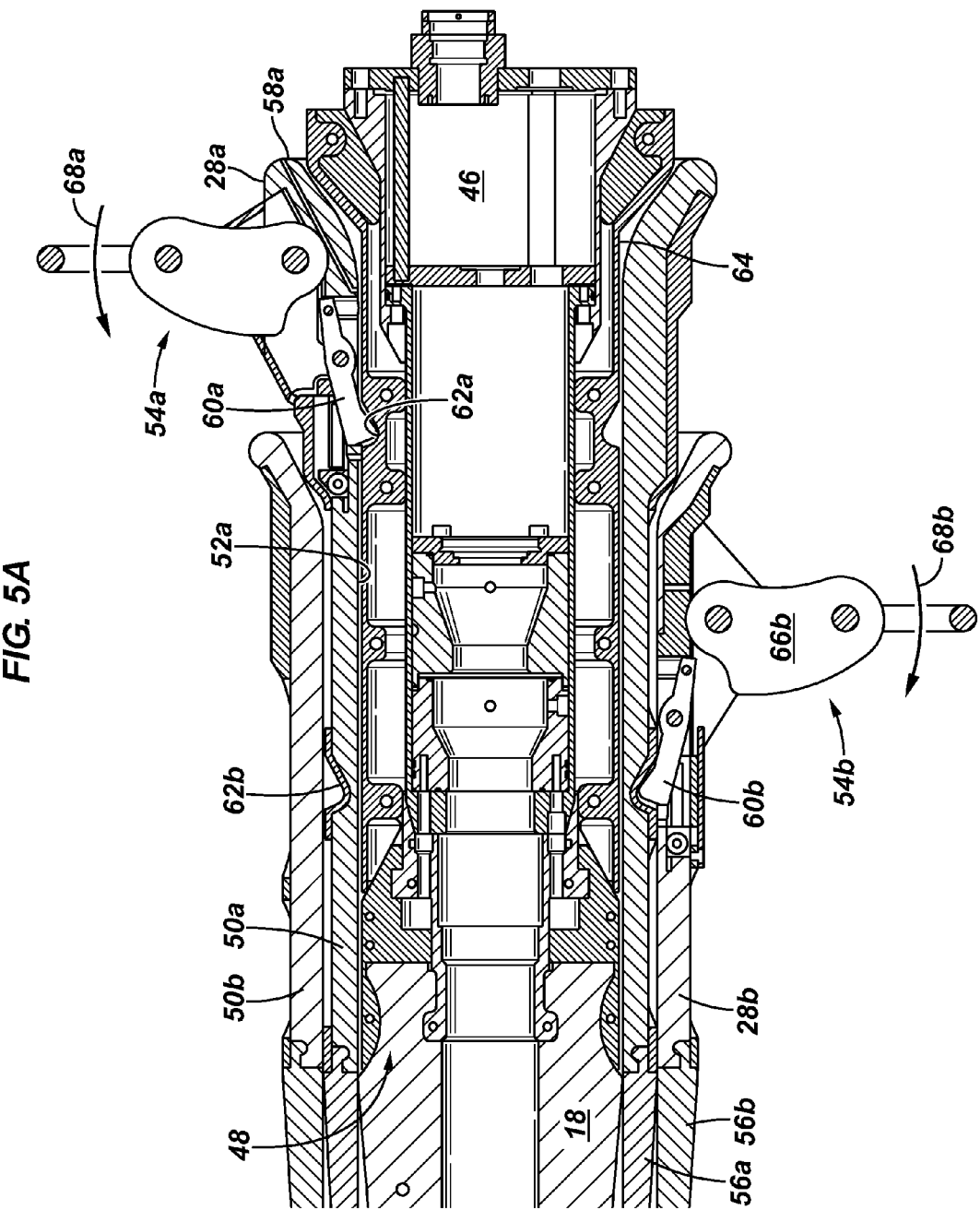
FIG. 5A is a cross-section view of the assembly of FIG. 5.

FIG. 5 is an elevation view of dual attachment device configuration. FIG. 5A is a sectional view of the device and assembly of FIG. 5. The embodiment depicted in FIGS. 5, 5A will be described with reference to FIG. 5 and with further reference to system 10 depicted in FIG. 4. The second end 31 of distance member 30bc is connected to source tow member 18c proximate terminal end 46 via attachment device 28a. The first end 29 of distance member 30cd is connected to source tow member 18c via attachment device 28b. With reference to FIGS. 1-4, attachment device 28a may be referred to as the aft, or downstream, attachment device relative to attachment device 28b and vessel 12. Attachment device 28b may be referred to as the forward or upstream attachment device relative to attachment device 28a. Device 28a may also be referred to as the inner attachment device and device 28b as the outer attachment device according to the embodiment illustrated in FIGS. 5, 5A.

In some embodiments, including the embodiment of FIGS. 5, 5A, attachment devices 28a and 28b are adapted to be physically and releasably connected to one another to facilitate the release of both attachment devices from a fixed position on tow member 18. In embodiment of FIGS. 5, 5A, attachment devices 28a, 28b are similar in construction and operation and will be described with reference to attachment device 28a for purposes of brevity. Subscripts are utilized herein to describe elements and features relative to one device, or assembly, which have a similar if not identical counterpart in another assembly. For example, subscripts are utilized to differentiate a first and a second attachment device in the dual attachment device configuration of FIGS. 5 and 5A. Similarly, features which are common to attachment device 28a and 28b include subscripts when necessary to identify the feature relative to one or the other attachment device 28.

Referring to FIG. 5A, attachment device 28a includes a housing 50a having an internal bore 52a and a releasable engagement, or locking, mechanism 54a. In the illustrated embodiment, housing 50a includes a forward (relative to the tow vessel) funnel portion 56a and an aft (relative to the tow vessel) open end 58a. Funnel portion 56a may be a tapered diameter portion adapted to correspond substantially with the contour and general outside diameter of the bend restrictor 48 portion of tow member 18. Funnel portions 56a, 56b may be utilized to aid in positioning the attachment device proximate terminal end 46 and/or for positioning outer attachment device 28b over inner attachment device 28a according to the embodiment of FIGS. 5 and 5A. Funnel portion 56a, 56b may additionally provide length to the attachment device to aid in the travel of the attachment device along tow member 18 as described further below.

Each attachment device 28 includes a locking mechanism 54 that includes a first engagement member 60 that is cooperative with a second engagement member 62 to secure the attachment device in a fixed position relative to second engagement member 62 when member 60 and 62 are engaged with one another. In the embodiment of FIGS. 5, 5A first engagement members 60a and 60b are projections, referred to herein as a dog, and second engagement members 62a and 62b are recesses. Referring to attachment device 28a, second engagement member 62a is recess formed on an outer diameter of tow member 18. Referring to attachment device 28b, second engagement member 62b is a recess formed on the outer diameter or surface of housing 50a. In the embodiment of FIG. 5A, a base member 64 is connected to tow member 18 at terminal end 46 extending aft from bend restrictor 48. Second engagement member 62b, corresponding to locking mechanism 54a of first attachment device 28a, is formed on the outer surface of base 64.

The locking mechanism is described further with reference specifically to locking mechanism 54b shown in FIG. 5A. According to this embodiment, locking mechanism includes a pivoting lever 66b that is operationally connected to a distance member 30cd (FIG. 5). As shown in FIG. 5A, locking mechanism 54b is in the locked or engaged position, with an end of dog 60b being disposed in second engagement recess 62b, securing attachment device 28b to attachment device 28a which is also locked or secured to terminal end 46 in FIG. 5A. When pivot lever 66b is moved in the direction of the arrow 68b, it contacts first engagement member 60b and pivots it out of engagement with second engagement member 62b disengaging second attachment device 28b from fixed engagement with first attachment device 28a. With reference to FIGS. 1-4, arrow 68 is directed in a forward direction oriented toward vessel 12.

Figure 6:
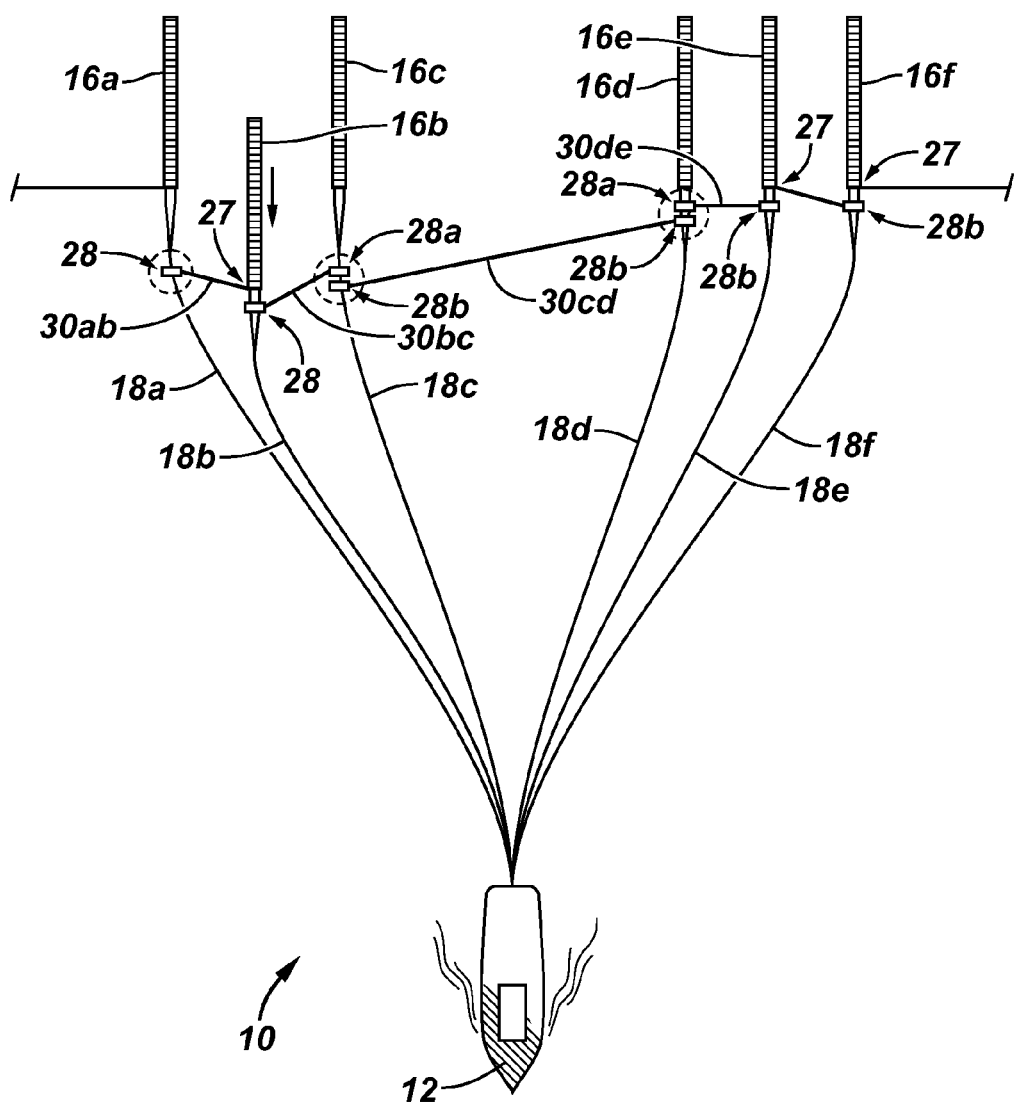
FIG. 6 is an aerial, schematic view of a spread of source arrays illustrating the independent retrieval of one of the source arrays in accordance with an exemplary embodiment of the invention.

FIG. 6 is an aerial, schematic view of a spread of source arrays illustrating the independent retrieval the source arrays. A method of retrieving one or more source arrays is now described with reference to FIGS. 1-6. In this example it is desired to retrieve source array 16b independent of source arrays 16a, 16c, 16d, 16e and 16f. Source array 16b is moved toward vessel 12 as shown by the arrow along source tow member 18b. In the illustrated embodiment, at least some of the source array strings are connected to a distance member 30 by a locking attachment device 28. Some of the source arrays, for example source array 16c and 16d, include dual attachment devices 28a, 28b. In the dual attachment device arrangement front attachment device 28b and aft attachment device 28a are selectively engaged with one another.

In an initial position, shown in FIG. 4, each of the attachment devices 28 are in the engaged position and secured in a fixed position relative to terminal end 46 (e.g., the sea end) of source tow member 18. In the case of dual attachment devices on a source array string, for example with reference to source array 16c, the aft attachment device 28a is engaged with terminal end 46 and the forward attachment device 28b is engaged with aft attachment device 28a.

Source array 16b may be retrieved toward vessel 12 in various manners known in the art. It is desired that source array 16b be retrieved leaving the other source array strings deployed. As source array 16b moves forward toward vessel 12, distance member 30ab actuates the attachment member 28 that is connected to source array 16a to disengage it from fixed connection with tow member 18a. Thus, locking mechanism 54 (FIG. 5, 5A) of source array 16a is actuated to the disengaged position freeing attachment device 28 disposed on source array string 16a to slide along source tow member 18a toward vessel 12. In this example, distance member 30bc is connected to adjacent source array string 16c via an aft attachment device 28a. The force applied across distance member 30bc operates the locking mechanism of aft attachment device 28a thereby releasing it from a fixed position engagement with source array string 16c. It is noted that forward movement, and the force through distance member 30bc does not move attachment device 28b of string 16c to the disengaged position. However, front attachment device 28b is engaged in a fixed position to aft attachment device 28a and therefore is freed to move along source tow member 18c. Front attachment device 28b on source array string 16d is now released from it respective aft attachment device 28a on source array 16d in response to the force and angle that distance member 30cd takes when source array 16b is pulled toward vessel 12. Thus, according to some embodiments, interconnecting source arrays utilizing distance members 30 and attachment devices 28 facilitate maintaining the source arrays in a desired spacing when the attachment devices are in an engaged position and facilitating independent retrieval of individual source arrays.

Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A marine seismic system comprising:
a first tow member, a second tow member and a third tow member deployed from a tow vessel in a spaced apart relationship;
an inner attachment device comprising an internal bore through which the first tow member is disposed and an inner locking mechanism operational from an engaged position securing the inner attachment device in a fixed position relative to the first tow member and a disengaged position permitting the inner attachment device to move on the first tow member;
an outer attachment device comprising an internal bore through which the first tow member is disposed and an outer locking mechanism operational from an engaged position securing the outer attachment device to the inner attachment device and a disengaged position permitting the outer attachment device to move on the first tow member independent of the inner attachment device;
a first distance member having a first end connected to the inner locking mechanism and a second end connected to the second tow member wherein the inner locking mechanism is operated to the disengaged position by a force applied across the first distance member toward the tow vessel; and
a second distance member having a first end connected to the outer locking mechanism and a second end connected to the third tow member, wherein the outer attachment device is operated to the disengaged position in response to a force applied across the second distance member toward the tow vessel.

2. The system of claim 1, wherein the internal bore of the inner attachment device comprises a tapered internal diameter portion extending from an open aft end.

3. The system of claim 2, wherein the tapered internal diameter bore portion of the inner attachment device substantially corresponds to an outside diameter of a bend restrictor portion of the first tow member.

4. The system of claim 1, wherein the second end of the first distance member is connected to the second tow member by one selected from a non-engaging device that is moveably disposed on the second tow member, and a shackle fixedly connected to the second tow member.

5. The system of claim 4, wherein the internal bore of the inner attachment device comprises a tapered internal diameter portion extending from an open aft end.

6. The system of claim 5, wherein the tapered internal diameter bore portion of the inner attachment device substantially corresponds to an outside diameter of a bend restrictor portion of the first tow member.

7. The system of claim 1, further comprising a second attachment device disposed on the second tow member, wherein the second attachment device comprises an internal bore through which the second tow member is disposed and a second locking mechanism operational between an engaged position securing the second attachment device in a fixed position relative to the second tow member and a disengaged position permitting the second attachment device to move along a portion of the second tow member, wherein the second end of the first distance member is connected to the second tow member via the second locking mechanism and wherein the second locking mechanism is operated to the disengaged position in response to force applied across the first distance member toward the tow vessel.

8. The system of claim 7, wherein the second end of the second distance member is connected to the third tow member via a third attachment device comprising an internal bore through which the third tow member is disposed and a third locking mechanism operational between an engaged position and a disengaged position, wherein the third locking mechanism is operated to the disengaged position in response to a force applied across the second distance member toward the tow vessel.

9. The system of claim 1, further comprising:
a second inner attachment device disposed on the second tow member, the second inner attachment device comprising an internal bore through which the second tow member is disposed and a second inner locking mechanism operational from an engaged position securing the second inner locking mechanism in a fixed position relative to the second tow member and a disengaged position permitting the second inner attachment device to move along a portion of the second tow member; and
a second outer attachment device disposed on the second tow member, the second outer attachment device comprising an internal bore through which the second tow member is disposed and a second outer locking mechanism operational from an engaged position securing the second outer attachment device to the second inner attachment and a disengaged position permitting the second outer attachment device to move on the second tow member independent of the second inner attachment device;
wherein the second end of the first distance member is connected to the second tow member via one of the second inner attachment device and the second outer attachment device.

10. The system of claim 9, wherein the second end of the second distance member is connected to the third tow member via a third attachment device comprising an internal bore through which the third tow member is disposed and a third locking mechanism operational between an engaged position securing the third locking mechanism in a fixed position relative to the third tow member and a disengaged position permitting the third attachment device to move on the third tow member, wherein the third locking mechanism is operated to the disengaged position in response to a force applied across the second distance member toward the tow vessel.

11. A method of operating a marine seismic system, comprising:
towing a deployed seismic source from a tow vessel, the deployed seismic source comprising a first source array connected to a terminal end of a first tow member, a second source array connected to a terminal end of a second tow member, and a first distance member having a first end connected proximate the terminal end of the first tow member and a second end connected proximate the terminal end of the second tow member by a first attachment device comprising an internal bore disposing the second tow member and a first locking mechanism in an engaged position securing the first attachment device in a fixed position relative to the second tow member; and
retrieving only the first source array from the deployed seismic source comprising:
pulling the first tow member and first source array toward the tow vessel; and
disengaging the first locking mechanism of the first attachment device in response to a force applied across the first distance member by the pulling the first tow member thereby permitting movement of the first attachment device along the second tow member toward the tow vessel.

12. The method of claim 11, wherein the first end of the first distance member is fixedly connected to the first tow member by a shackle.

13. The method of claim 11, wherein the internal bore of the first attachment device comprises a tapered internal diameter portion extending from an open aft end, the tapered internal diameter portion substantially corresponding to an outside diameter of a bend restrictor portion of the second tow member.

14. The method of claim 11, wherein:
the deployed seismic source further comprises a third source array connected at a terminal end of a third tow member towed from the tow vessel, a first end of a second distance member connected proximate the terminal end of the first tow member and a second end of the second distance member connected proximate the terminal end of the third tow member by a second attachment device comprising an internal bore disposing the third tow member and a locking mechanism in an engaged position securing the second attachment device in a fixed position relative to the third tow member; and
wherein the retrieving only the first source array from the deployed seismic source further comprises disengaging the locking mechanism of the second attachment device in response to a force applied to the locking mechanism of the second attachment device by the pulling the first tow member thereby permitting movement of the second attachment device along the third tow member to the tow vessel.

15. The method of claim 14, wherein the first end of the first distance member is fixedly connected to the first tow member by a shackle.

16. A method comprising:
towing a deployed seismic source from a tow vessel, the deployed seismic source comprising:
a first source array connected to a first terminal end of a first tow member, a second source array connected to a second terminal end of a second tow member, and a third source array connected to a third terminal end of a third source array;
an inner attachment device secured to the first terminal end by an inner locking mechanism operable to a disengaged position releasing the inner attachment device to move along the first tow member;
an outer attachment device secured to the inner attachment device by an outer locking mechanism operable to a disengaged position releasing the outer attachment device to move along the first tow member independent of movement of the inner attachment device;
a second attachment device secured to the second terminal end by a second locking mechanism operable to a disengaged position releasing the second attachment device to move along the second tow member;
a third attachment device secured to the third terminal end by a third locking mechanism operable to a disengaged position releasing the third attachment device to move along the third tow member;
a first distance member having a first end connected to the inner locking mechanism and a second end connected to the second locking mechanism, wherein the inner locking mechanism is operated to the disengaged position by a force applied across the first distance member toward the tow vessel and wherein the second locking mechanism is operated to the disengaged position by a force applied across the first distance member toward the tow vessel; and
a second distance member having a first end connected to the outer locking mechanism and a second end connected to the third locking mechanism, wherein the outer locking mechanism is operated to the disengaged position by a force applied across the second distance member toward the tow vessel and wherein the third locking mechanism is operated to the disengaged position by a force applied across the second distance member toward the tow vessel; and
retrieving to the tow vessel one of the first, second and third tow members separate from the other of the first, second and third tow members.

17. The method of claim 16, wherein the retrieving to the tow vessel one of the first, second and third tow members separate from the other of the first, second and third tow members comprises:
pulling the first tow member toward the tow vessel;
operating the second locking mechanism to the disengaged position in response to the pulling the first tow member permitting the second attachment device to move along the second tow member toward the tow vessel; and
operating the third locking mechanism to the disengaged position in response to the pulling the first tow member permitting the third attachment device to move along the third tow member toward the tow vessel.

18. The method of claim 16, wherein the retrieving to the tow vessel one of the first, second and third tow members separate from the other of the first, second and third tow members comprises:
pulling the second tow member toward the tow vessel;
operating the inner locking mechanism to the disengaged position in response to the pulling the second tow member permitting the inner attachment device and the outer attachment device to move along the first tow member toward the tow vessel; and
operating the third locking mechanism to the disengaged position in response to the pulling the second tow member permitting the third locking device to move along the third tow member toward the tow vessel.

19. The method of claim 16, wherein the retrieving to the tow vessel one of the first, second and third tow members separate from the other of the first, second and third tow members comprises:
pulling the third tow member toward the tow vessel;
operating the outer locking mechanism to the disengaged position in response to the pulling the third tow member permitting the outer attachment device to move along the first tow member toward the tow vessel.

* * * * *